United States Patent [19]

Song et al.

[11] Patent Number: 5,680,862
[45] Date of Patent: Oct. 28, 1997

[54] ITERATIVE METHOD OF DETERMINING TRAJECTORY OF A MOVING REGION IN A MOVING MATERIAL USING VELOCITY MEASUREMENTS IN A FIXED FRAME OF REFERENCE

[75] Inventors: Samuel M. Song, San Francisco; Norbert J. Pelc, Los Altos, both of Calif.

[73] Assignee: The Board of Trustees of the Leland Stanford Junior University, Palo Alto, Calif.

[21] Appl. No.: 381,801

[22] Filed: Feb. 1, 1995

[51] Int. Cl.$^6$ ........................................ A61B 5/055
[52] U.S. Cl. ............................ 128/653.2; 324/307
[58] Field of Search ................ 128/653.2, 661.09, 128/662.01, 664, 665; 324/307, 309, 312, 306; 356/27

[56] References Cited

U.S. PATENT DOCUMENTS

| | | |
|---|---|---|
| 5,042,485 | 8/1991 | Sano et al. . |
| 5,195,525 | 3/1993 | Pelc ........................... 128/653.2 |
| 5,257,625 | 11/1993 | Pelc ........................... 128/653.2 |
| 5,257,626 | 11/1993 | Pelc et al. . |
| 5,318,026 | 6/1994 | Pelc . |
| 5,363,844 | 11/1994 | Riederer et al. . |
| 5,445,151 | 8/1995 | Darrow et al. . |
| 5,545,993 | 8/1996 | Taguchi et al. . |
| 5,577,502 | 11/1996 | Darrow et al. . |
| 5,581,184 | 12/1996 | Heid . |

OTHER PUBLICATIONS

Pelc, et al., Phase Contrast Cine Magnetic Resonance Imaging, Magnetic Resonance Quarterly, vol. 7, pp. 229–254 (1991).

Pelc et al., 3-D Analysis of Myocardial Motion and Deformation with Phase Contrast Cine MRI, Book of Abstracts, Society of Magnetic Resonance in Medicine, vol. 1, p. 18 (Berlin, Germany), 1992.

*Primary Examiner*—Marvin M. Lateef
*Assistant Examiner*—Shawna J. Shaw
*Attorney, Agent, or Firm*—Townsend and Townsend and Crew LLP; Henry K. Woodward

[57] ABSTRACT

Several algorithms are presented for determining the trajectory of a particle in motion given cine phase contrast (PC) velocity field data. The PC velocity field is usually measured in a fixed frame of reference (spatial coordinates) and must be transformed to the velocity in material coordinates, i.e., the velocity experienced by individual points in the medium. The material velocity field can then be integrated to yield the trajectory of a particular point. Therefore, to determine the trajectory of a particular point, the given spatial velocity field must be transformed to the material velocity field. While there exists a mathematical relationship that maps velocity fields in spatial coordinates to material coordinates, this mapping can be applied only if particle trajectories are known. Although there appears to be a dilemma here, through an optimization technique, we have devised an iterative procedure to determine the optimal trajectory in the sense to be defined.

9 Claims, 10 Drawing Sheets

ITERATIVE METHOD OF DETERMINING TRAJECTORY OF A MOVING REGION IN A MOVING MATERIAL USING VELOCITY MEASUREMENTS IN A FIXED FRAME OF REFERENCE

This invention was made with Government support under Contract No. HL 46347 awarded by the National Institutes of Health. The Government has certain rights in this invention.

BACKGROUND OF THE INVENTION

This invention relates generally to magnetic resonance imaging (MRI), and more particularly the invention relates to motion analysis and imaging of a moving particle or region in a moving material such as elements of the heart using cine phase contrast velocity field data from MRI measurements.

Early methods for the visualization of cardiac wall motion utilized conventional radiological images. Due to the lack of visually distinguishable features in these images, invasive radio-opaque markers were implanted to allow the measurement of myocardial dynamics. Recently, due to innovations in dynamic magnetic resonance imaging (MRI), images analogous to the radiographic images with implanted markers, depicting the cardiac wall motion, have been obtained non-invasively. These MR spin tagging techniques place spatial magnetic markers or grids on the cardiac wall non-invasively so that the movement of the grid lines on the cardiac wall aids in the visualization of wall motion. Cine phase contrast (PC MRI) as discussed by Pelc et al. "Phase contrast cine magnetic resonance imaging", Magnetic Resonance Quarterly, vol. 7, pp. 229–254, (1991), can directly measure the velocity field experienced by the myocardium throughout the cardiac cycle. The measured velocity field can then be use to track any number of regions retrospectively, as discussed by Pelc et al. "3-D Analysis of Myocardial Motion and Deformation With Phase Contrast Cine MRI", in Book of Abstracts; Society of Magnetic Resonance in Medicine, vol. 1 (Berlin, Germany) pg. 18, (1992).

U.S. Pat. Nos. 5,257,625 and 5,257,626 disclose methods of processing cine phase contrast MRI velocity field data to obtain estimates of trajectories of regions within a moving object, such as portions of the heart wall. Both forward integration of velocities and reverse integration of velocities can be used to obtain motion trajectories, and time frame positions can be determined by combining the two trajectories (forward-backward integration). In one method, a trajectory is first established based on velocity measurements, a velocity error is determined, and the trajectory is recalculated frame-by-frame using the velocity error to obtain an improved estimate of the trajectory.

The present invention is directed to determining an optimal trajectory using an iterative process in analyzing the entire trajectory at once rather than a frame-by-frame analysis as in the prior art.

SUMMARY OF THE INVENTION

Briefly, in accordance with the invention a method of determining a trajectory of a moving particle in a moving material comprises the steps of obtaining velocity measurements, v, of the moving particle in a fixed frame of reference using, for example, magnetic resonance cine phase contrast velocity measurements. A first estimate of particle trajectory, $r^{(0)}$, based on the velocity measurements is obtained. The computed trajectory is then refined iteratively. In each iteration, a new trajectory $r^{(k+1)}$ is computed using the trajectory from the previous iteration $r^{(k)}$ and the measured velocities. The trajectory is computed so as to minimize the inconsistency between the trajectory and the measured velocities.

In one specific implementation, a function h is defined which includes velocity and possibly higher order motion terms. Thus, h(r) is the measured motion (velocity plus higher order terms) along the trajectory. An operator H is also defined so that Hr is the object's motion as evident in the computed trajectory r. The algorithm according to the present invention iteratively computes the trajectory r so that $$\|Hr - h(r)\|_2^2$$

is minimized.

Successive linearization of the above equation results in the following iterative solution for the trajectory which minimizes the equation as follows:

$$r^{(k+1)} = r^{(k)} - (H - \nabla h(r^{(k)})^{**})(Hr^{(k)} - h(r^{(k)}))$$

where a nominal initial trajectory $r^{(0)}$ can be obtained by a previous forward-backward integration technique.

If the velocity field is smoothly varying so that the term $\nabla h(r^{(k)})$ is small, the iterative process can be simplified as follows:

$$r^{(k+1)} = (H^T H)^{-1} H^T h(r^{(k)})$$

The invention and objects and features thereof will be more readily apparent from the following detailed description and appended claims when taken with the drawing.

DETAILED DESCRIPTION OF THE ILLUSTRATIVE EMBODIMENT

In accordance with the invention, several algorithms are derived and analyzed for determining the trajectory of a particle in motion given velocity field data, for example, as measured with cine PC MRI. The PC velocity field is usually measured in fixed frame of reference (spatial coordinates) and must be transformed to the velocity in material coordinates, i.e., the velocity experienced by individual points in the medium. The material velocity field can then be integrated to yield the trajectory of a particular point.

Therefore, to determine the trajectory of a particular point, the given spatial velocity field must be transformed to the material velocity field. Although there exists a mathematical relationship that maps velocity fields in spatial coordinates to material coordinates, this mapping can be applied only if particle trajectories are known. Although there appears to be a dilemma here, through an optimization technique in accordance with the invention, we have devised an iterative procedure to determine the optimal trajectory in the sense to be defined.

As a preliminary, we present the notation and review certain concepts in continuum mechanics. Consider a physical body occupying a region of space $\Omega_0$ at time t=0. This body is in motion and is subject to deformation. The region $Q\Omega_O$ consists of points or particles that can be associated with the position vector R=(X,Y,Z) in one-to-one correspondence. Therefore, the mapping "particle=R" is bijective so that each particle may be uniquely labeled with a position vector R.

As this body deforms in time, to occupy a deformed region $\Omega$, at time t, a particle with label R=(X,Y,Z) $\in\Omega_O$ will have moved to a new position r=(x,y,z) $\in\Omega_r$. This mapping is generally described by $$r=r(R,t) \quad (1)$$

The mapping r(R,t) describes the trajectory of the particle initially located at R. In continuum mechanics, R and r are referred to as the material (Lagrangian) and spatial (Eulerian) variables respectively.

Let V(R,t) denote velocity in material description i.e., velocity of the particle initially at R. It follows that $$\frac{\partial}{\partial t} r(R,t) = V(R,t). \quad (2)$$

Furthermore, let v(r,t) denote velocity in spatial description, i.e., velocity of the particle currently at r, for instance, as measured by phase contrast MRI. In view of (2), knowledge of V(R,t) is necessary to determine r(R,t) for a given R. Thus, to determine the trajectory r(R,t), given R, we use the following mapping between the two descriptions of the velocity (material and spatial):

$$V(R,t)=v(r(R,t),t). \quad (3)$$

The above is a manifestation of the fact that at time t, the velocity of the particle initially at R is identical to the velocity of the particle currently at r(R,t). Both describe the velocity, at time t, of the same particle, namely, the particle with label R.

The trajectory r(R,t) can be expanded using Taylor series as follows:

$$\begin{aligned} r(R,t+T) &= r(R,t)+\frac{\partial}{\partial t}r(R,t)T+\frac{\partial^2}{\partial t^2}r(R,t)T^2/2+\ldots \\ &= r(R,t)+V(R,t)T+A(R,t)T^2/2+\ldots \\ &= r(R,t)+v(r(R,t),t)T+a(r(R,t),t)T^2/2+\ldots \end{aligned} \quad (4)$$

where A and a denote acceleration in the material and spatial descriptions respectively. Once v(r,t) is given, the acceleration a(r,t) may be computed from v(r,t) using the convective acceleration:

$$a(r,t)=\frac{\partial}{\partial t}v+(v\cdot\nabla)v \quad (5)$$

However, rather than using the above differentiation approach, we have used the following to determine the acceleration:

$$a(r(R,t),t)=\frac{v(r(R,t+T),t+T)-v(r(R,t),t)}{T}. \quad (6)$$

Due to the fact that Equation (6) has no spatial derivatives, the behavior of (6) is expected to be superior to that of (5) in the presence of noise.

Let r(n) be samples of the trajectory, i.e., $r(n)=r(R,t)|_{t=nT}$. Then, the discretization of (4) can be seen to be $$\begin{aligned} r(n+1) &= r(n)+v(r(n),n)T+a(r(n),n)T^2/2+\ldots \\ &= r(n)+h(r(n),n) \end{aligned} \quad (7)$$

where we have lumped all higher order terms into h(r(n),n). The value h is therefore the incremental motion due to velocity along with higher order terms (e.g., acceleration) as evident in the velocity field. Equation (7) readily suggests a forward integration method for determining samples of the trajectory:

$$r_f(n)=r(0)+\sum_{i=0}^{n-1}h(r_f(i),i), \quad n=1,\ldots,N-1. \quad (7A)$$

where $r_f(0)=r(0)$, the initial position. As alluded to previously, we approximate h as follows:

$$\begin{aligned} h(r(i),i) &\approx v(r(i),i)T+a(r(i),i)T^2/2 \\ &\approx \frac{1}{2}[v(r(i),i)T+v(r(i+1),i+1)T] \end{aligned} \quad (8)$$

where v(r(i+1),i+1) may be approximated by $$v(r(i)+v(r(i),i)T,i+1)$$

Furthermore, by the periodicity assumption, i.e., r(R,t)=r(R, t+NT), so that r(0)=r(N), reversing the time in (4) yields the following backward integration method:

$$r_b(n)=r(N)-\sum_{i=n}^{N-1}h(r_b(i),i), \quad n=1,\ldots,N-1 \quad (8A)$$

where $r_b(N)=r(0)$, the initial position. It is reasonable to model the noise in the measurement h(r(n),n) as a random-walk process so that the variance of $r_f(n)$ is proportional to time, n, while the variance in $r_b(n)$ is proportional to (N−n). Then, we may weight the forward and backward integrations with their respective variances to yield the following "forward-backward" integration technique:

$$r_{fb}(n)=\frac{N-n}{N}r_f(n)-\frac{n}{N}r_b(n)=r(0)+\frac{N-n}{N}\sum_{i=0}^{n-1}h(r_f(i),i)- \quad (9)$$

$$\frac{n}{N} \sum_{i=n}^{N-1} h(r_b(i),i), n = 1, \ldots N-1$$

This forward-backward method is equivalent to that disclosed in U.S. Pat. No. 5,257,626. The technique above will be shown to be related to a special case of the "optimal solution", which will be derived in the following.

To obtain the optimal trajectory, we formulate the problem of determining the trajectory of the particle with label R, i.e., r(R,t), given a time varying velocity field using an optimization approach. Continuing with our development, Equation (7) can be represented in vector form as follows:

$$h(r) = Hr \quad (10)$$

where $$h(r) = \begin{bmatrix} h(r(0),0) \\ h(r(1),1) \\ \cdot \\ \cdot \\ \cdot \\ h(r(N-2),N-2) \\ h(r(N-1),N-1) \end{bmatrix} + \begin{bmatrix} r(0) \\ 0 \\ \cdot \\ \cdot \\ \cdot \\ 0 \\ -r(0) \end{bmatrix}$$

$$H = \begin{bmatrix} 1 & 0 & 0 & 0 & 0 \\ -1 & 1 & 0 & 0 & 0 \\ 0 & -1 & 1 & 0 & 0 \\ \cdots & & \cdots & & \cdots \\ 0 & 0 & 0 & -1 & 1 \\ 0 & 0 & 0 & 0 & -1 \end{bmatrix} \quad (10A)$$

$$r = [r(1), r(2), \ldots, r(N-1)]^T$$

where the superscript $^T$ indicates matrix transpose and r(0)=R is given.

Figure 1:
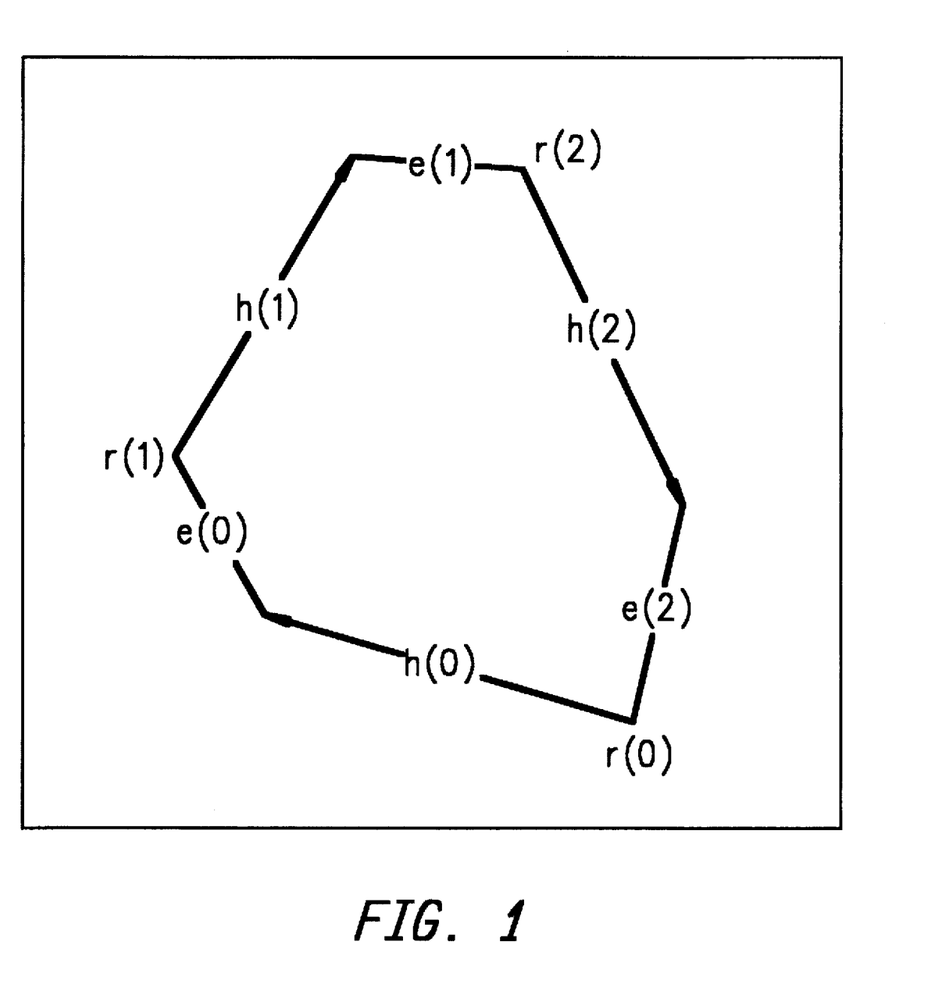
FIG. 1 is a graphical representation of the optimization problem to which the present invention is addressed for the value N=3.

Intuitively, h(r) is the motion (due to velocity plus higher order terms as evident in the measured velocity) while Hr is the equivalent motion as represented by the trajectory r. Thus, e=Hr−h(r) is the discrepancy between the measured data and the trajectory estimate. The above formulation suggests the following optimization problem: given h, find the trajectory, r such that the objective functional $$\|Hr - h(r)\|_2^2 \quad (11)$$

is minimized. In other words, we want to find the trajectory r so that it "best fits" Hr=h(r) (10). Graphically, FIG. 1 shows the trajectory r, the given data h, and the error e=Hr−h(r). The minimizer of (11) is the trajectory that minimizes the norm of the error e.

Due to the fact that h depends on the position r, minimization of (11) is a non-linear problem. In estimation theory, such problems are solved by successively linearizing the problem. We obtain the minimizer of the non-linear optimization problem (11) by successive linearization as follows.

Assume that a nominal trajectory r* is known which is "close" to the desired trajectory r. Define $$\delta = r - r^* \quad (12)$$

The Taylor series expansion of h(r) about r* yields $$h(r) = h(r^* + \delta) \quad (12A)$$
$$\approx h(r^*) + \nabla h(r^*)^T \delta$$

Therefore, the objective functional (11) can be "linearized" as $$\|(H - \nabla h(r^*)^T)\delta + (Hr^* - h(r^*))\|_2^2 \quad (13)$$

where T denotes matrix transpose. Since r* is known, the above is a problem requiring minimization over δ. The minimizer of the above objective functional can be seen to be $$\delta = -(H - \nabla h(r^*)^T)^{**}(Hr^* - h(r^*)) \quad (13A)$$

where ** denotes pseudo-inverse. Therefore, the solution r can be written as $$r = r^* + \delta = r^* - (H - \nabla h(r^*)^T)^{**}(Hr^* - h(r^*)) \quad (13B)$$

Successive linearization of (11) using the above procedure results in the following iterative solution for the trajectory which minimizes (11):

$$r^{(k+1)} = r^{(k)} - (H - \nabla h(r^{(k)})^T)^{**}(Hr^{(k)} - h(r^{(k)})) \quad (14)$$

where a nominal initial trajectory $r^{(0)}$ can by the previous forward-backward integration technique (9). Equation (14) describes a procedure where the current iterate $r^{(k)}$ is updated using the current error, $(Hr^{(k)} - h(r^{(k)}))$.

On the other hand, if we assume the velocity field to be smoothly varying so that $\nabla h(r^{(k)})$ is small enough, we may use the following iterative method:

$$r^{(k+1)} = (H^T H)^{-1} H^T h(r^{(k)}) \quad (15)$$

where we have used the fact that H is full-rank, so that $H^{**} = (H^T H)^{-1} H^T$. As will be shown, in practical applications, given enough time and spatial resolution in the velocity field data, $\nabla h(r^{(k)})$ will be small enough so that both methods, (14) and (15), yield similar trajectories.

It can be shown that this simplified optimal method has some similarities to the forward-backward integration method. Each component of forward-backward, i.e., the forward and backward integrations, are recursive. The location in one frame is computed from the location in the previous frame and the measured velocities, as shown in Equation 7. Higher order motion (e.g., acceleration) can be accommodated but is complicated by the need for estimated positions in subsequent time frames. The present invention does not compute the trajectory recursively. Instead, the entire trajectory is computed at once and is iteratively optimized to minimize an error function (e.g., Equation 11).

Another prior art method, U.S. Pat. No. 5,257,625 (forced closure) also uses an iterative approach. In forced closure an additive velocity offset is estimated in one iteration and subtracted in the next. In contrast to the present invention, the method was not derived so as to directly minimize the discrepancy between the measured velocity data and the computed trajectory.

Results with several simulated velocity fields representing rotations, translations and deformations are now considered. Using these simulated velocity fields, the trajectories computed by the three methods—the forward-backward integration method (9), the optimal method (14), and the simplified optimal method (15)—are compared to the true trajectory. Lastly, the trajectories obtained from cardiac PC MR velocity data will be presented.

Figure 2:
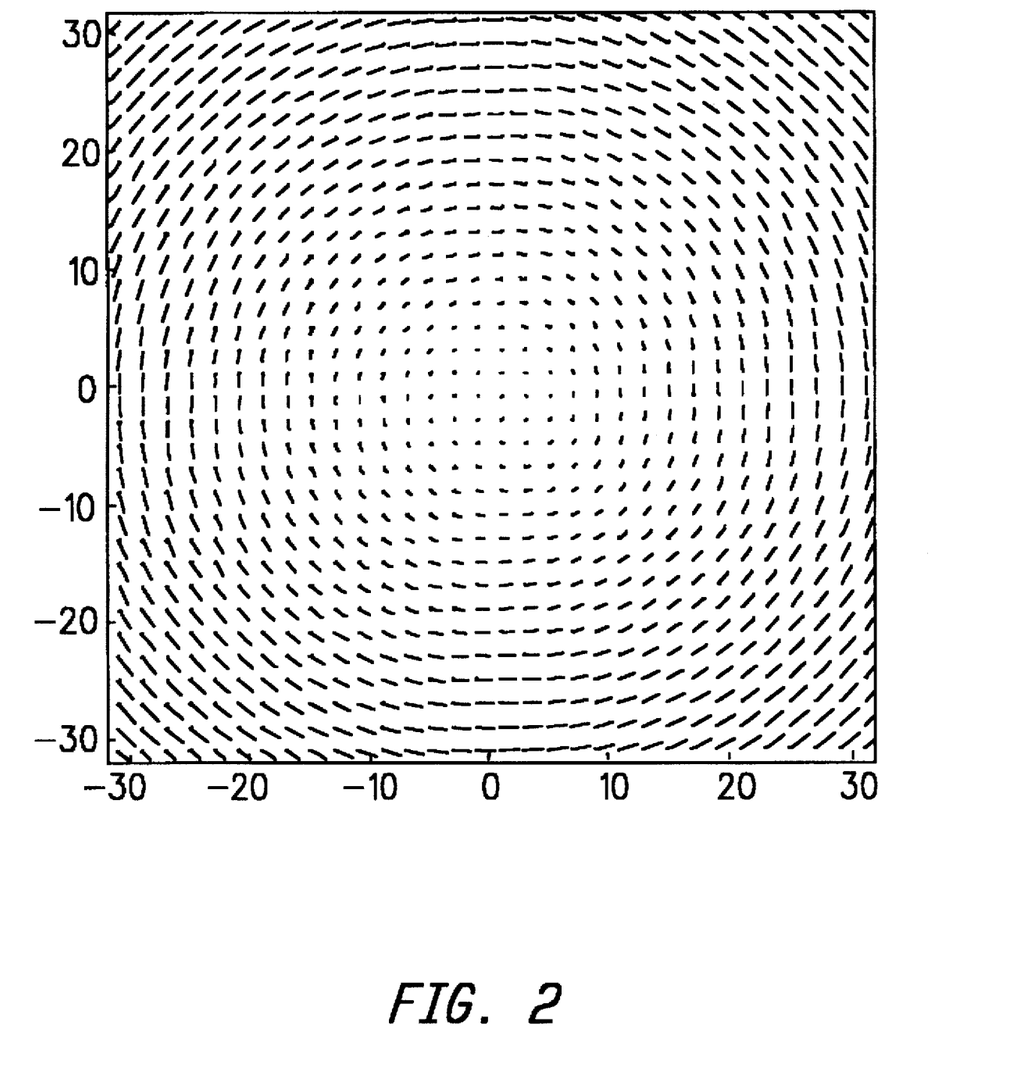
FIG. 2 is a velocity field generated by a rigid rotation.

For a rigid rotation (2D), the samples of the normalized velocity field can be mathematically written as:

$$u(x,y,n) = -R \sin(\tan^{-1}(y/x)) \quad (16)$$
$$v(x,y,n) = R \cos(\tan^{-1}(y/x))$$

where Note that u and v do not depend on the time variable n. FIG. 2 shows the velocity field generated by the above with a large N for visual purposes.

FIG. 3-(a) shows the results of the experiment with the image size 64×64 with N=16. With the initial position (X,Y)=(20,0), the trajectories obtained by the forward-backward integration (dashed), the simplified optimal method (dash-dot), and the optimal method (dotted) all exhibit sub-pixel accuracy, as they all lie on top of the true $$R = \frac{2\pi}{N} \sqrt{x^2 + y^2} \tag{16A}$$

Figure 3A:
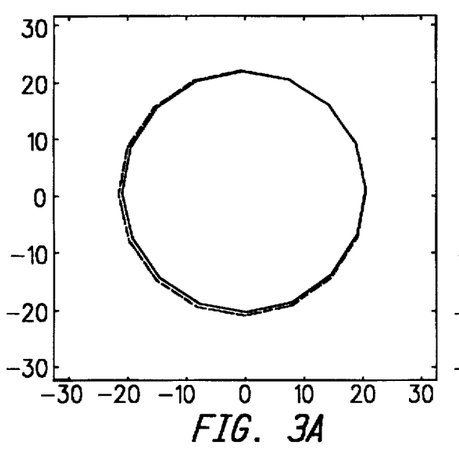
FIGS. 3A–3D are plots of trajectories for a rigidly rotating object with different time resolution (velocity field without noise); true (solid), forward-backward integration (dashed), simplified optimal method (dash-dot), and optimal method (dotted) in accordance with the invention for different values of number of frames, N.
Figure 3B:
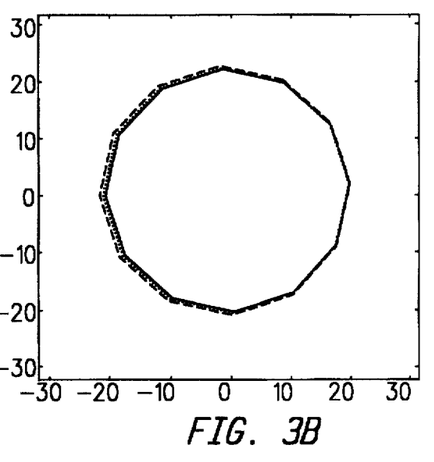
Figure 3C:
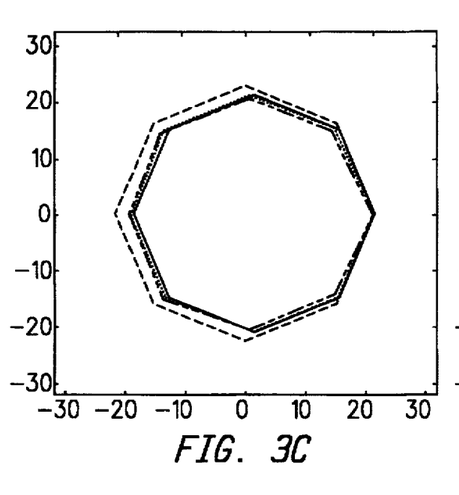
Figure 3D:
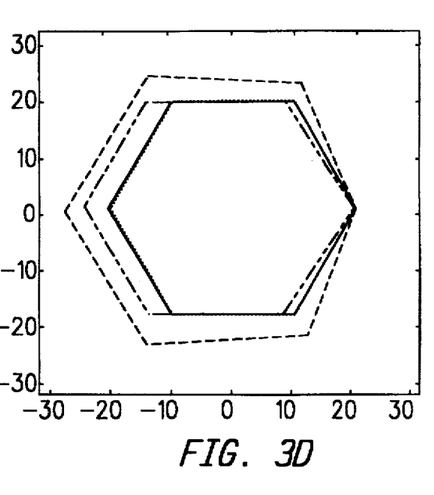
Figure 4A:
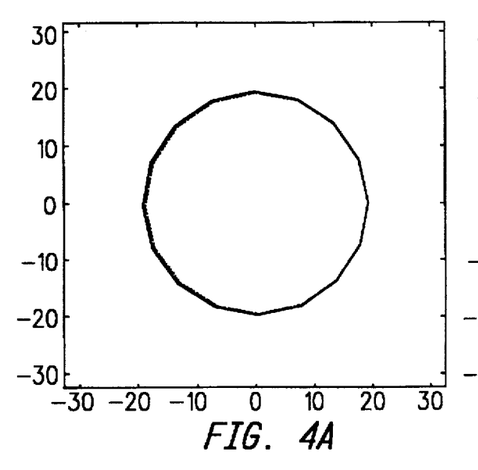
FIG. 4A–4D are plots of trajectories for a rigidly rotating object with different signal to noise ratio (SNR) with a true trajectory (solid), forward-backward integration (dashed), simplified optimal method (dash-dot), and optimal method (dotted) for different values of SNR.
Figure 4B:
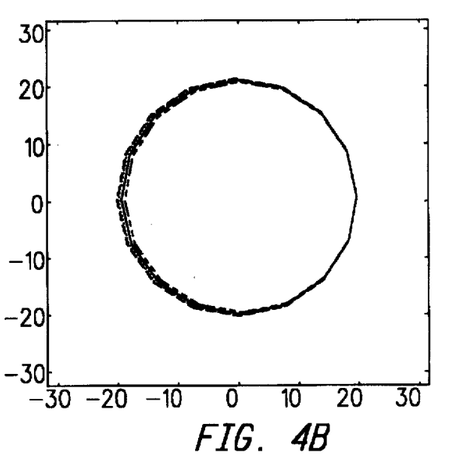
Figure 4C:
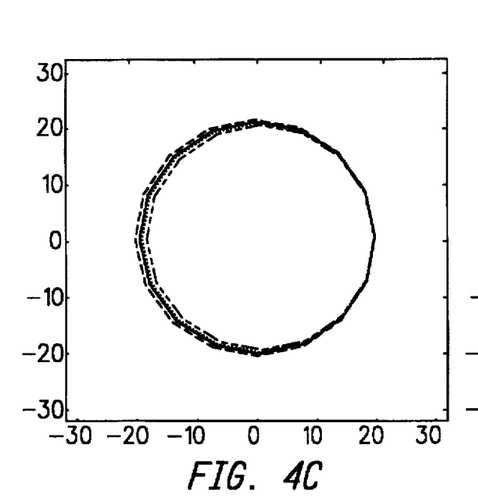
Figure 4D:
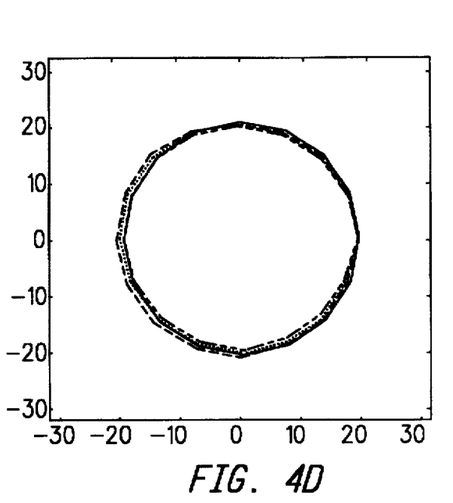

$(x,y)$ = pixel grid locations
$N$ = number of frames
$n = 0, 1, 2, \ldots, N-1$, and
$u$ and $b$ are the $x$ and $y$ velocity components, respectively trajectory (solid).

As we reduce the number of frames, so that the violation of the condition $\nabla h(r)=0$ becomes significant, the trajectories behave differently. The experiments shown in FIG. 3-(b), (c) and (d), with N=12, 8, and 6, respectively, indicate that the discrepancy among the trajectories increases as the time resolution decreases. The largest discrepancy in the trajectories can be seen in FIG. 3-(d). Here, the forward-backward integration method (dashed) results in a trajectory which in the middle of the cycle (n=3,4) is in error by more than 10 pixel lengths. The simplified method results in the error on order of 5 pixel lengths. The optimal method appears to achieve nearly perfect trajectory in all experiments shown in FIG. 3, including the case N=6.

The robustness of the algorithm in the presence of noise was tested with the number of frames N=16 so that the violation of the condition $\nabla h(r)=0$ does not dominate the error process. Spatially stationary white Gaussian noise of a specified SNR (velocity noise with respect to the velocity at the initial position (X,Y)=(20,0)) was added. FIG. 4-(a) through (d) shows the results of the experiments with SNR=32, 16, 8 and 4, respectively. The effect of noise in the velocity measurement is comparable in all three methods. Therefore, despite the required differentiation of the velocity field for obtaining $\nabla h(r)$, the optimal method appears to have similar noise characteristics as the other methods, where $\nabla h(r)$ is not computed.

A simple elastic system (2D) which stretches in one axis and contracts in the other can be described by the following velocity field:

$$u(x,y,n) = Ax \sin(2\pi n/N) \tag{17}$$

$$v(x,y,n) = -Ay \sin(2\pi n/N)$$

where A is some nominal scale factor. Note that the divergence of the above velocity field is zero so that the incompressibility of the medium is preserved.

Figure 5:
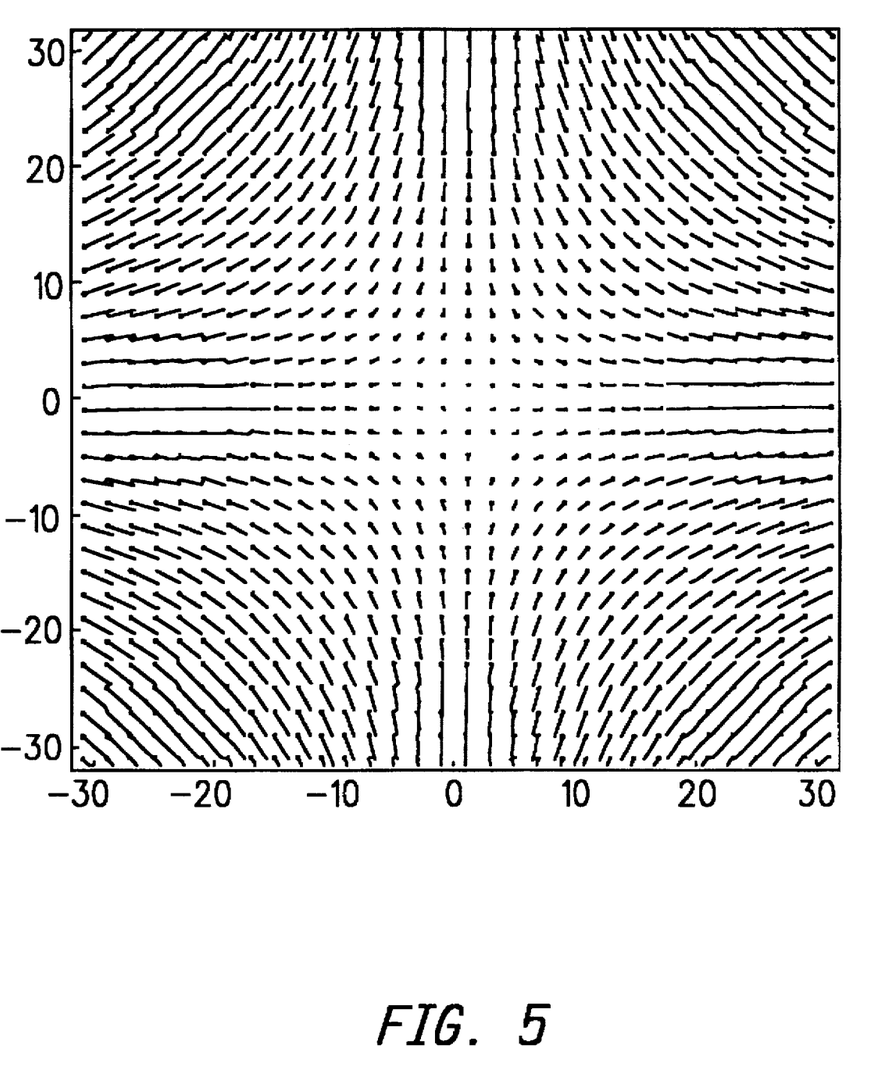
FIG. 5 illustrates a velocity field generated by a deforming elastic object.
Figure 6A:
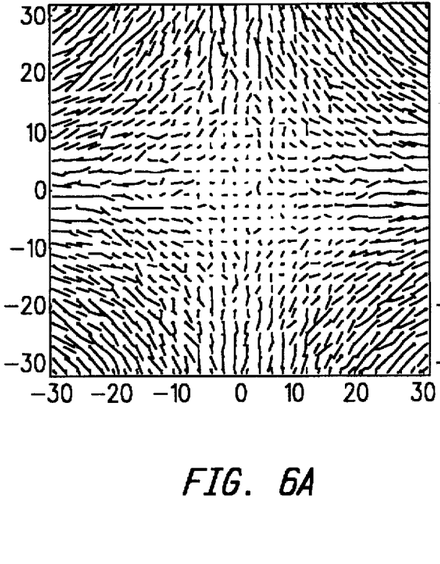
FIGS. 6A–6B are velocity fields as in FIG. 5 with additive noise (SNR of 8 and 4, respectively).
Figure 6B:
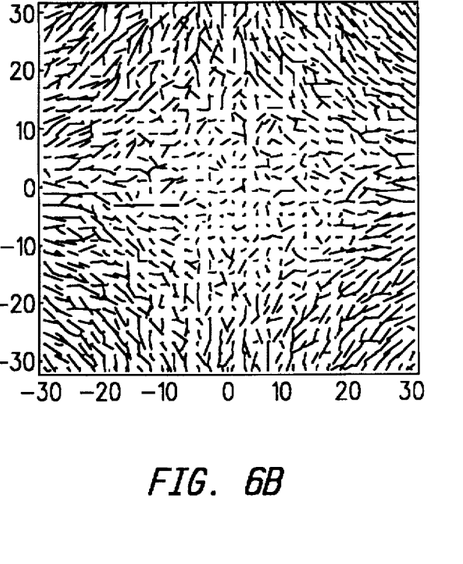

FIG. 5 shows the velocity field at n=1. Contraction and stretch along the x- and y- axes are evident. Noise of SNR=8 and 4 was added to this velocity field and the resulting noisy velocity fields are depicted in FIGS. 6(a) and 6(b). Two-dimensional trajectories were computed using all three methods with the initial position (X,Y)=(28,10).

Figure 7A:
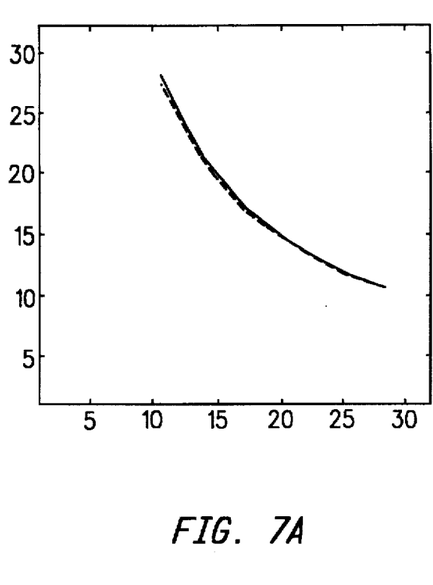
FIGS. 7A–7B are plots of trajectories for a deforming elastic object with SNR of 8 and 4, respectively; true (solid), forward-backward integration (dashed), simplified optimal method (dash-dot), and optimal method (dotted).
Figure 7B:
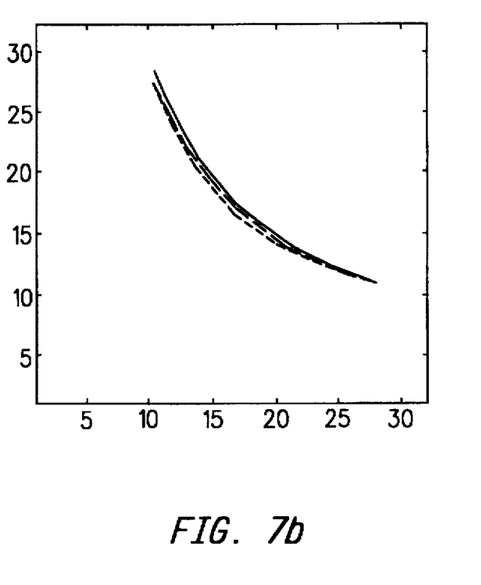

FIG. 7 shows the trajectories computed by the three methods. It can be seen that in both experiments (SNR=8 and 4), the results are well behaved. There is no large difference among the algorithms nor as a function of SNR. It suggests that in this deforming model, the velocity field is locally smooth enough so that the violation to the condition $\nabla h(r)$ =0 is relatively insignificant.

To simulate a 3-D motion case, we used the velocity field below with a rigid rotation in the x-y plane and a translation along the z-axis:

$$u(x,y,z,n) = -R\sin(\tan^{-1}(y/x)) \tag{18}$$
$$v(x,y,z,n) = R\cos(\tan^{-1}(y/x))$$

$$w(x,y,z,n) = \begin{cases} B, & \text{for } n < N/2 \\ -B, & \text{else} \end{cases} \tag{19}$$

where $$R = \frac{2\pi}{N} \sqrt{x^2 + y^2} \tag{19A}$$

$B$ = some constant, and
$w$ is the velocity
in the $z$ direction

Note that u and v do not depend on the time variable n as in the previous 2-D rotation example (16). However, the z-component of the velocity field w, is defined as a constant translation along the z-axis that changes direction at n=N/2. The above discrete velocity field of size 32×32×12 with N=16 frames was generated and noise of SNR=8 and 4 were added for the experiment.

Figure 8A:
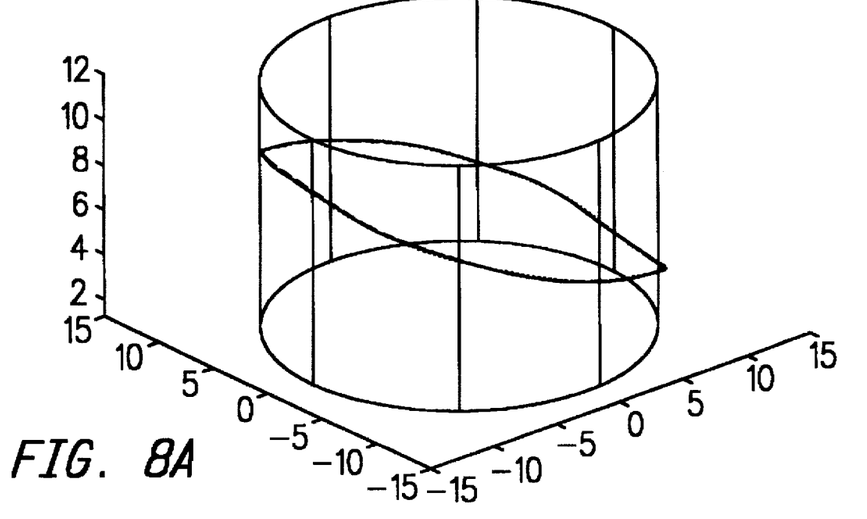
FIGS. 8A, 8B are plots of trajectories for a 3-D object with rotation and translation with SNR equal 8 and 4, respectively; true trajectory (solid), forward-backward integration (dashed), simplified optimal method (dash-dot), and optimal method (dotted).
Figure 8B:
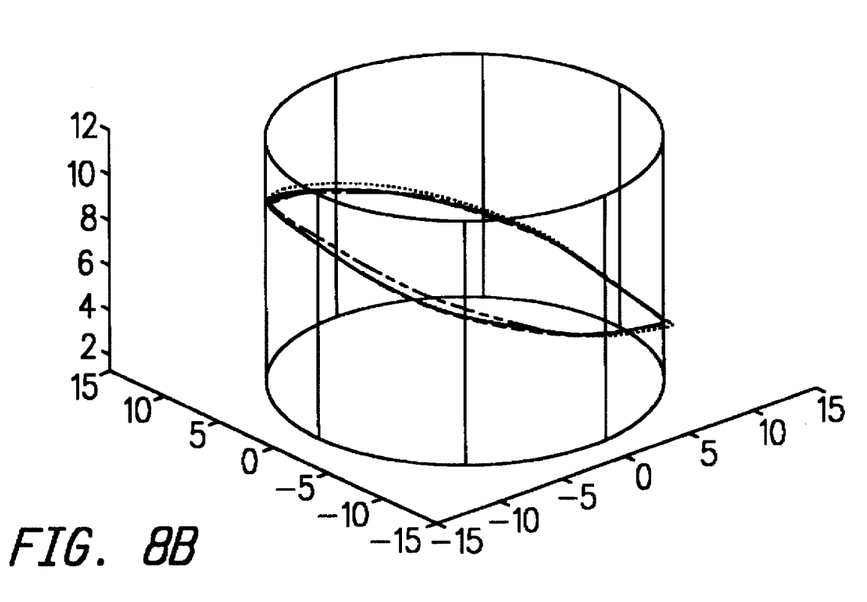

The trajectories were computed using all three methods with the initial position (X,Y,Z)=(12, 0, 2.5). FIG. 8 shows the trajectories computed by the three methods. As in the previous examples the results are not significantly different. Again, it appears that in this model, the velocity field is locally smooth enough, so that the violation to the condition $\nabla h(r)=0$ is relative insignificant.

All directions cardiac cine PC MR velocity data was obtained from a volunteer (field-of-view=32 cm, 7 mm slice thickness, encoding velocity=20 cm/s, 16 cardiac phases) from a 1.5-T system (Signa; GE Medical Systems, Milwaukee, Wis.). For demonstration purposes, we selected four initial positions on the myocardium encircling the left ventricle on a single slice. The trajectories were obtained using the three methods: the forward-backward integration method (9), the optimal method (14), and the simplified optimal method (15). The resulting trajectories are shown in FIG. 9.

Figure 9:
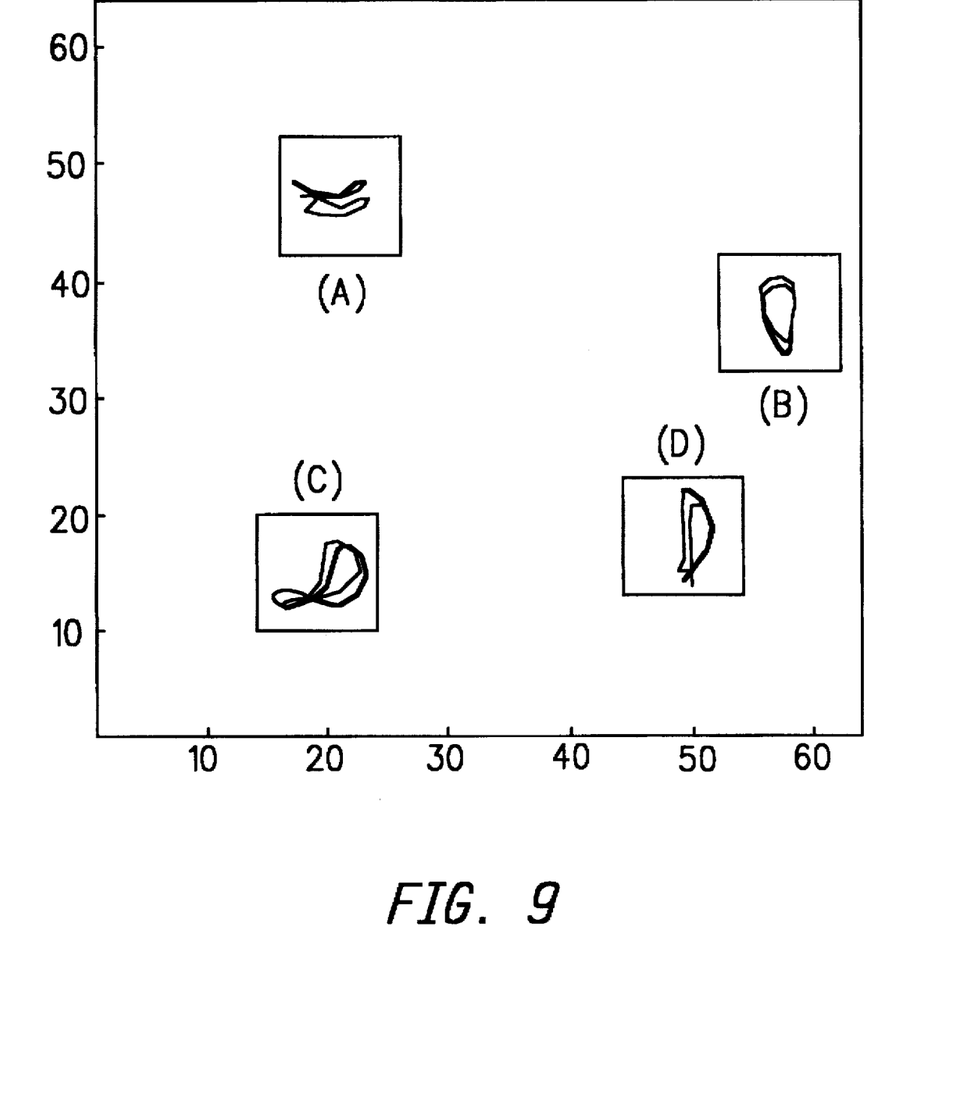
FIG. 9 illustrates plots of trajectories obtained from cardiac phase contrast MRI data.
Figure 10A:
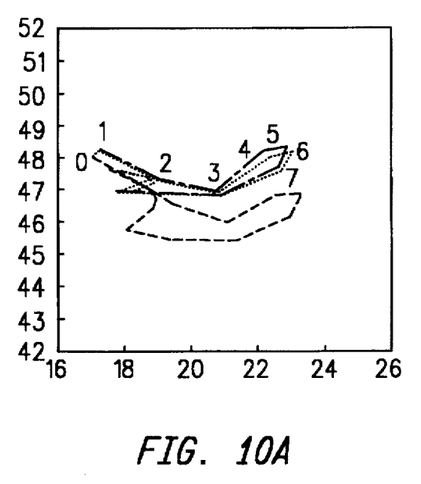
FIGS. 10A–10D are zoomed plots for trajectories in FIG. 9.
Figure 10B:
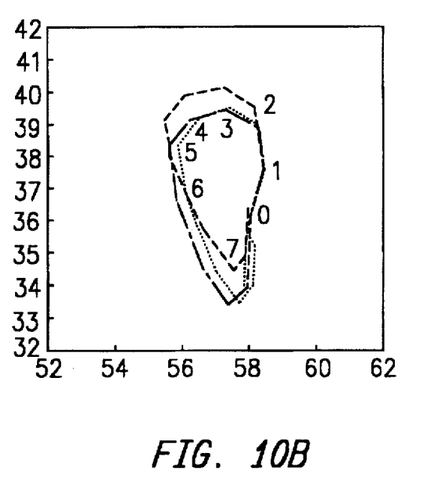
Figure 10C:
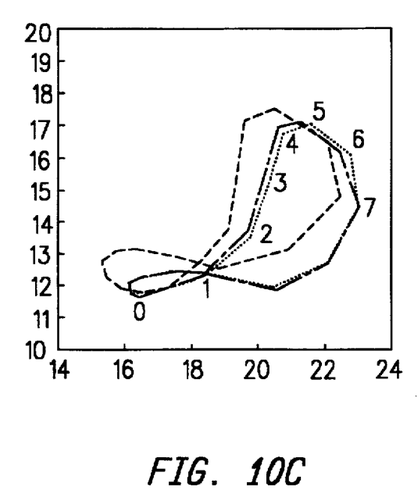
Figure 10D:
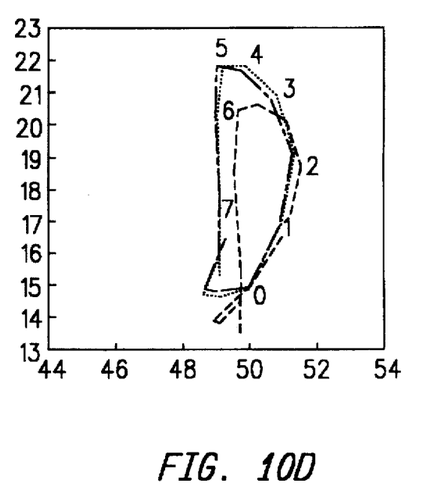

FIG. 10 shows zoomed plots of the boxed areas in FIG. 9. First eight time frames (n=0 through 7) are indicated as numerals on the plot so that the initial position (at n=0) and the sense of direction can be visualized. Although we cannot be certain as to the correctness of these trajectories, the optimal trajectory (dotted line) is the solution that minimizes the norm of the error e. In addition, as illustrated in FIG. 3-(d), the optimal method yields a considerably better trajectory for velocity fields sampled sparsely in time. Therefore, although the true motion is not known, the optimal trajectory is probably closest to the true trajectory.

It can be seen that the two trajectories obtained by the simplified optimal method and the optimal method are within subpixel lengths of each other. However, the forward-backward integration method, in all four trajectories (FIGS. 10-(a), (b), (c) and (d)), appears to be different by as much as two pixel lengths. Thus, for cardiac applications with the above imaging parameters, use of the optimal or the simplified optimal methods may be preferred. If the computational load of the optimal method becomes a burden, then the simplified optimal method may be used without sacrificing performance, at least for myocardial tracking applications.

Figure 11:
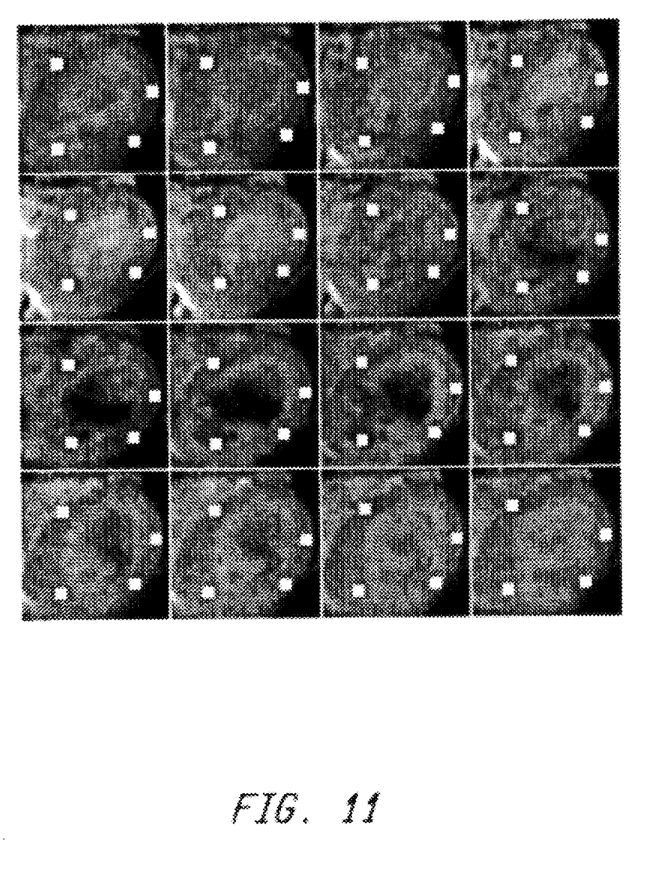
FIG. 11 illustrates magnitude images of cardiac cine phase contrast MRI with time increasing from left to right and from top to bottom.

Finally, FIG. 11 shows the magnitude images for all 16 cardiac phases. The original 256×256 images are cropped to 64×64 region surrounding the left ventricle and the trajectory determined by the optimal method is indicated by white squares (or markers) on the image. These images are usually viewed in a cine loop.

In summary, we have presented and evaluated three tracking algorithms: the prior art forward-backward integration method (9), the optimal method (14) in accordance with the invention, and the simplified optimal method (15) in accordance with the invention. Using simulated sequence of velocity fields, the trajectories resulting from the three methods were compared to true trajectories. Both the optimal method and the simplified optimal method in accordance with the invention were shown to be superior to the simple forward-backward integration method, particularly for velocity fields sampled sparsely in time. In cardiac applications, the trajectories obtained using phase contrast velocity field data showed that the optimal and simplified optimal methods yield similar trajectories. This suggests the use of the simplified optimal method, with lesser computational demand, without sacrificing performance.

While the invention has been described with references to specific embodiments, the description is illustrative of the invention and is not to be construed as limiting the invention. Various applications and modifications may occur to those skilled in the art without departing from the true scope and spirit of the invention as defined by the appended claims.

What is claimed is:

1. A method of determining a repetitive closed trajectory of a moving particle in a moving material comprising the steps of:

a) obtaining magnetic resonance velocity measurements of said moving particle in a fixed frame of reference for a plurality of time frames in a closed trajectory, b) estimating in a first iteration a first closed particle trajectory in material coordinates based on said velocity measurements, and c) minimizing inconsistencies between a previous closed trajectory and the velocity measurements by iteratively refining an entire estimated closed trajectory at once using an entire closed trajectory in a previous iteration and the velocity measurements.

2. The method as defined by claim 1 wherein step a) includes obtaining magnetic resonance cine phase contrast velocity measurements.

3. The method as defined by claim 2 wherein step b) includes estimating a closed trajectory using a forward-backward integration of velocity measurements.

4. The method as defined by claim 3 wherein the particle location in a timeframe, n, is r(n), where r(0) is the starting location and N is the number of time frames, the measured motion of said moving particle is h(r), and computed motion based on the computed trajectory is Hr, and step c) minimizes $$\|Hr-h(r)\|_2^2.$$

5. The method as defined by claim 4 wherein the iterative refining based on successive linearization is given by:

$$r^{(k+1)} = r^{(k)} - (H - \nabla h(r^{(k)})^T)^{**}(Hr^{(k)} - h(r^{(k)})).$$

6. The method as defined by claim 4 wherein the iterative refining by an successive linearization is given by $$r^{(k+1)} = (H^T H)^{-1} H^T h(r^{(k)}).$$

7. The method as defined by claim 4 wherein the trajectory r(n+1) using samples of the trajectory r(n) is given by:

$$\begin{aligned} r(n+1) &= r(n) + v(r(n),n)T + a(r(n),n)T^2/2 + \ldots \\ &= r(n) + h(r(n),n) \end{aligned}$$

where $$h(r) = \begin{bmatrix} h(r(0),0) \\ h(r(1),1) \\ \cdot \\ \cdot \\ \cdot \\ h(r(N-2),N-2) \\ h(r(N-1),N-1) \end{bmatrix} + \begin{bmatrix} r(0) \\ 0 \\ \cdot \\ \cdot \\ \cdot \\ 0 \\ -r(0) \end{bmatrix}$$

$$H = \begin{bmatrix} 1 & 0 & 0 & 0 & 0 \\ -1 & 1 & 0 & 0 & 0 \\ 0 & -1 & 1 & 0 & 0 \\ \ldots & \ldots & & & \ldots \\ 0 & 0 & 0 & -1 & 1 \\ 0 & 0 & 0 & 0 & -1 \end{bmatrix}$$

$$r = [r(1), r(2), \ldots, r(N-1)]^T$$

$T$ = matrix transpose.

8. A method of determining a trajectory of a moving particle in a moving material comprising the steps of:

(a) obtaining velocity measurements, h, of said moving particle in a fixed frame of reference, (b) obtaining a first estimate of particle trajectory, r(1), based on said velocity measurements and errors in velocity measurements to achieve a closed trajectory, (c) iteratively updating said estimates of particle trajectory, r, using r(n) samples of said trajectory as follows:

$$\begin{aligned} r(n+1) &= r(n) + v(r(n),n)T + a(r(n),n)T^2/2 + \ldots \\ &= r(n) + h(r(n),n) \end{aligned}$$

and in vector form $$h(r) = Hr$$

where $$h(r) = \begin{bmatrix} h(r(0),0) \\ h(r(1),1) \\ \cdot \\ \cdot \\ \cdot \\ h(r(N-2),N-2) \\ h(r(N-1),N-1) \end{bmatrix} + \begin{bmatrix} r(0) \\ 0 \\ \cdot \\ \cdot \\ \cdot \\ 0 \\ -r(0) \end{bmatrix}$$

$$H = \begin{bmatrix} 1 & 0 & 0 & 0 & 0 \\ -1 & 1 & 0 & 0 & 0 \\ 0 & -1 & 1 & 0 & 0 \\ \ldots & \ldots & & & \ldots \\ 0 & 0 & 0 & -1 & 1 \\ 0 & 0 & 0 & 0 & -1 \end{bmatrix}$$

$$r = [r(1), r(2), \ldots, r(N-1)]^T$$

$T$ = matrix transpose.

so that $$\|Hr-h(r)\|_2^2$$

is minimized.

9. The method as defined by claim 8 wherein step a) includes obtaining magnetic resonance cine phase contrast velocity measurements.

* * * * *